(12) United States Patent
Yanchar et al.

(10) Patent No.: US 10,712,904 B2
(45) Date of Patent: Jul. 14, 2020

(54) GRAPHICAL PLANNER

(71) Applicant: Squnch, LLC, Chardon, OH (US)

(72) Inventors: Jake Yanchar, Chardon, OH (US); Georgia Elizabeth Yanchar, Chardon, OH (US)

(73) Assignee: SQUNCH, LLC, Chardon, OH (US)

( * ) Notice: Subject to any disclaimer, the term of this patent is extended or adjusted under 35 U.S.C. 154(b) by 0 days.

(21) Appl. No.: 16/355,987

(22) Filed: Mar. 18, 2019

(65) Prior Publication Data

US 2019/0278462 A1 Sep. 12, 2019

Related U.S. Application Data

(63) Continuation of application No. 15/700,265, filed on Sep. 11, 2017, now Pat. No. 10,261,656, which is a continuation of application No. 14/262,862, filed on Apr. 28, 2014, now Pat. No. 9,760,245, which is a continuation of application No. 12/791,617, filed on Jun. 1, 2010, now Pat. No. 8,713,459.

(60) Provisional application No. 61/182,129, filed on May 29, 2009.

(51) Int. Cl.
*G06F 3/048* (2013.01)
*G06F 3/0481* (2013.01)
*G06Q 10/10* (2012.01)
*G06F 40/134* (2020.01)
*G06F 3/0488* (2013.01)

(52) U.S. Cl.
CPC ........ *G06F 3/04817* (2013.01); *G06F 3/0488* (2013.01); *G06F 40/134* (2020.01); *G06Q 10/109* (2013.01); *G06Q 10/1093* (2013.01)

(58) Field of Classification Search
CPC .. G06F 3/04817; G06F 40/134; G06F 3/0488; G06Q 10/109; G06Q 10/1093
USPC .......................................................... 715/763
See application file for complete search history.

(56) References Cited

U.S. PATENT DOCUMENTS

| | | |
|---|---|---|
| 5,991,735 A | 11/1999 | Gerace |
| 6,633,315 B1 | 10/2003 | Sobeski et al. |
| 6,999,066 B2 | 2/2006 | Litwiller |
| 7,218,575 B2 | 5/2007 | Rosevear |
| 7,383,503 B2 | 6/2008 | Banks |
| 7,788,598 B2 | 8/2010 | Bansal et al. |
| 7,975,011 B2 | 7/2011 | Pounds et al. |
| 7,975,239 B2 | 7/2011 | Bellotti et al. |
| 7,992,096 B1 | 8/2011 | Davis |
| 8,028,249 B2 | 9/2011 | Loui et al. |
| 8,051,380 B2 | 11/2011 | Knapp et al. |
| 8,463,872 B2 | 6/2013 | Pounds et al. |
| 8,713,459 B2 | 4/2014 | Yanchar et al. |
| 8,799,354 B2 | 8/2014 | Thomas et al. |
| 9,407,901 B2 * | 8/2016 | Lee ...................... H04N 13/361 |

(Continued)

*Primary Examiner* — David Phantana-angkool
(74) *Attorney, Agent, or Firm* — Calfee, Halter & Griswold LLP (57) ABSTRACT

A graphical planner allows a user to create or select, and then display, images that represent tasks and events to be completed by the user, as well as corresponding images that represent tasks and events that the user has already completed. The graphical planner allows a user to plan and schedule events and tasks by indicating an event or task in a non-textual (i.e., graphic or symbolic) manner. Completion of the events and tasks by the user can also be signaled or otherwise indicated in a non-textual (e.g., visual, audible) manner.

20 Claims, 8 Drawing Sheets

(56) References Cited

U.S. PATENT DOCUMENTS

| | | | |
|---|---|---|---|
| 9,460,422 B2 | 10/2016 | Reter et al. | |
| 9,511,561 B2 | 11/2016 | Rubin et al. | |
| 9,514,456 B2 | 12/2016 | Jacobson et al. | |
| 9,600,143 B2* | 3/2017 | Arun | G06F 16/40 |
| 9,760,245 B2 | 9/2017 | Yanchar et al. | |
| 10,489,027 B2* | 11/2019 | Fuse | G06F 3/0482 |
| D875,767 S * | 2/2020 | Farnan | D14/486 |
| 2004/0225966 A1 | 11/2004 | Besharat et al. | |
| 2005/0138631 A1 | 6/2005 | Bellotti et al. | |
| 2006/0190817 A1 | 8/2006 | Banks | |
| 2010/0077334 A1 | 3/2010 | Yang et al. | |
| 2011/0072492 A1 | 3/2011 | Mohler et al. | |
| 2011/0239145 A1 | 9/2011 | Kim | |
| 2011/0242024 A1 | 10/2011 | Fukumoto et al. | |
| 2018/0350144 A1* | 12/2018 | Rathod | H04W 4/029 |
| 2019/0065012 A1* | 2/2019 | Masi | G06Q 10/103 |
| 2019/0102919 A1* | 4/2019 | Josephson | G06Q 10/1095 |
| 2019/0121506 A1* | 4/2019 | Matikyan | G06F 3/0482 |

* cited by examiner

GRAPHICAL PLANNER

RELATED APPLICATION

This application is a continuation of U.S. patent application Ser. No. 15/700,265, filed Sep. 11, 2017, now U.S. Pat. No. 10,261,656, issued Apr. 16, 2019, which is a continuation of U.S. patent application Ser. No. 14/262,862, filed Apr. 28, 2014, now U.S. Pat. No. 9,760,245, issued Sep. 12, 2017, which is a continuation of U.S. patent application Ser. No. 12/791,617, filed Jun. 1, 2010, now U.S. Pat. No. 8,713,459, issued Apr. 29, 2014, which claims priority to and any benefit of U.S. Provisional Application No. 61/182,129, filed May 29, 2009, the entire contents of which are incorporated herein by reference.

FIELD

The general inventive concepts relate to data management and, more particularly, to systems, methods and apparatuses for creating, displaying, and managing images that represent tasks and events to be completed by a user and corresponding images that represent tasks and events that the user has completed.

BACKGROUND

Mobile computing devices such as "smart" phones (e.g., Apple's iPhone®, Research in Motion's Blackberry®, Google's Droid®), personal digital assistants ("PDAs"), and the like have become ubiquitous tools of modern life. In addition, tablet computers (e.g., Apple's iPad®) and other portable computing devices with a touch screen interface are becoming increasingly available. These developments have occasioned a significant increase in the number of applications being developed to run on such devices.

Applications for planning and scheduling events and tasks are known in the prior art. Some of these applications can be used in connection with mobile computing devices such as those described above. For the most part, prior art planners and calendars rely on a traditional calendar format to display events as text entries in a chronological list. Furthermore, tasks (i.e., things a person must get done, but not at a particular time) and events (i.e., things a person wants or needs to do at a predetermined or scheduled time) are managed, maintained, and displayed separately. For example, Microsoft's Outlook® application displays events on a traditional calendar in a linear format. Each event is shown in its own rectangular box positioned on relevant portions of the calendar. Conversely, tasks are shown in a list format that can be sorted/arranged based on various criteria (e.g., task name). Thus, using prior art planners and calendars, the user is limited to indicating an event or task in a block or list, in a linear manner.

Further, the prior art planners and calendars rely heavily upon using text (i.e., alphanumeric characters) to represent an event or task to be completed. As a result of the space constraints associated with the user interface (e.g., a screen) of most mobile computing devices, text is an impractical and cumbersome method of conveying information. Often, the amount of text that is required to convey information about an event or task, combined with the small space available, results in the text appearing too small to read. Thus, prior art planners fail to convey necessary information to the user.

Often, an image or symbol can convey a message much more efficiently than text. In addition, images have different meanings to different people. Moreover, the events and tasks any particular person wishes to accomplish are personal to that user. Thus, a need exists for a planner that allows each user to chose and/or create the particular images or symbols that efficiently convey to himself or herself the information he or she needs to schedule or plan events and tasks. Prior art planners fail to meet this need.

Moreover, the prior art planners and calendars fail to provide a mechanism (e.g., a noise and/or rewarding graphic) to signal successful completion of an event or task. As such, the prior art planners and calendars fail to provide the user with a sense of accomplishment upon completion of an event or task and, thus, there is less incentive to use them.

In view of the above, there is an unmet need for systems, methods and apparatuses for planning and scheduling events and tasks that allow a user to indicate an event or task in a freestyle, non-linear, and/or ad hoc manner. There is also an unmet need for systems, methods and apparatuses for planning and scheduling events and tasks that allow a user to indicate an event or task in a non-textual (i.e., graphic or symbolic) manner. There is also an unmet need for systems, methods and apparatuses for planning and scheduling events and tasks that provide a user with a non-textual (e.g., visual, audible) indication that an event or task has been completed. There is also an unmet need for systems, methods and apparatuses for displaying and managing events and tasks together instead of separately.

SUMMARY

The general inventive concepts contemplate systems, methods, and apparatuses for creating and displaying images that represent events and tasks to be completed by a user and corresponding images that represent events and tasks that the user has completed. By way of example to illustrate various aspects of the general inventive concepts, several exemplary embodiments of systems, methods and/or apparatuses are disclosed herein.

Systems, methods, and apparatuses, according to one exemplary embodiment, allow a user to plan and schedule events and tasks by indicating an event or task in a freestyle, non-linear, and/or ad hoc manner.

Systems, methods, and apparatuses, according to one exemplary embodiment, allow a user to plan and schedule events and tasks by indicating an event or task in a non-textual (i.e., graphic or symbolic) manner.

Systems, methods, and apparatuses, according to one exemplary embodiment, allow a user to plan and schedule events and tasks, wherein completion of the events and tasks are signaled by non-textual (e.g., visual, audible) indicators.

In one exemplary embodiment, an apparatus (e.g., a smart phone) for scheduling at least one of an event and a task to be completed by a user is disclosed. The apparatus includes a processing unit and a display. In one exemplary embodiment, the display is a touch screen. The processing unit includes (e.g., as software running therein) scheduling logic. The scheduling logic is operable to display a screen on the display, the screen including an add event button or the like; detect selection of the add event button by the user and display a plurality of graphic icons on the display in response thereto; detect selection of a specific graphic icon by the user for representing the event or task and display the specific graphic icon on the screen in response thereto; and allow the user to associate the specific graphic icon with at least one of a time and a date.

In one exemplary embodiment, the scheduling logic is operable to allow the user to move the specific graphic icon from a first region of the screen to another region of the screen.

In one exemplary embodiment, the scheduling logic is operable to associate the screen with at least a portion of a day (e.g., twelve hours).

In one exemplary embodiment, the screen includes a date region for displaying the current date.

In one exemplary embodiment, the scheduling logic is operable to display a calendar screen that functions as a user interface to allow the user to navigate to a particular day, month, and year.

In one exemplary embodiment, each day is associated with a first main screen and a second main screen, wherein the first main screen corresponds to the twelve hours in a day immediately before and including noon, wherein the second main screen corresponds to the twelve hours in a day immediately before and including midnight, and wherein the scheduling logic only displays one of the first main screen and the second main screen at a time.

In one exemplary embodiment, the scheduling logic is operable to provide an audible indication if the user associates the specific graphic icon with at least one of a time and a date.

In one exemplary embodiment, the scheduling logic is operable to display a details screen, window, or the like that functions as a user interface for allowing the user to input alphanumeric data, wherein the scheduling logic is operable to associate the alphanumeric data with the specific graphic icon. In one exemplary embodiment, the scheduling logic is operable to display at least a portion of the alphanumeric data within the specific graphic icon.

In one exemplary embodiment, the scheduling logic is operable to display a clock shape including a plurality of symbols representing a plurality of hours in a day on the main screen. In one exemplary embodiment, the clock shape approximates a substantially circular analog clock face.

In one exemplary embodiment, the symbols are numerals. In one exemplary embodiment, the clock shape includes an hour hand and a minute hand extending from a center of the clock shape, a position of the hour hand and the minute hand corresponding to the current time. In one exemplary embodiment, the scheduling logic is operable to display a line connecting the specific graphic icon to an area of the clock shape disposed between or adjacent to a first numeral representing a start time of the event or task and a second numeral representing an end time of the event or task.

In one exemplary embodiment, the scheduling logic is operable to allow the user to indicate that the event or task has been completed. In one exemplary embodiment, the scheduling logic is operable to cease displaying the specific graphic icon once it is determined that the task has been completed. In one exemplary embodiment, the scheduling logic is operable to replace the specific graphic icon with a different graphic icon once it is determined that the task has been completed. In one exemplary embodiment, the scheduling logic is operable to provide an audible indication once it is determined that the task has been completed.

In one exemplary embodiment, a method of scheduling at least one of an event and a task to be completed by a user is disclosed. The method includes displaying a screen on a display, the screen including an add event button or other means for initiating creation of a new event or task; detecting selection of the add event button by the user and displaying a plurality of graphic icons on the display in response thereto; detecting selection of a specific graphic icon by the user for representing the event or task and displaying the specific graphic icon on the screen in response thereto; and allowing the user to associate the specific graphic icon with at least one of a time and a date.

Numerous aspects of the general inventive concepts will become more readily apparent from the following detailed description of exemplary embodiments, from the claims and from the accompanying drawings.

BRIEF DESCRIPTION OF THE DRAWINGS

The general inventive concepts as well as embodiments and advantages thereof are described below in greater detail, by way of example, with reference to the drawings in which.

DESCRIPTION

While the general inventive concepts are susceptible of embodiment in many different forms, there are shown in the drawings, and will be described herein in detail, specific embodiments thereof with the understanding that the present disclosure is to be considered as an exemplification of the principles of the general inventive concepts. Accordingly, the general inventive concepts are not intended to be limited to the specific embodiments illustrated and/or described herein.

The following are definitions of exemplary terms used throughout the disclosure. Both singular and plural forms of all terms fall within each meaning:

"Logic," synonymous with "circuit" as used herein includes, but is not limited to, hardware, firmware, software and/or combinations of each to perform a function(s) or an action(s). For example, based on a desired application or needs, logic may include a software controlled microprocessor, discreet logic such as an application specific integrated circuit (ASIC), or other programmed logic device. In some instances, logic could also be fully embodied as software.

"Software" or "computer program" as used herein includes, but is not limited to, one or more computer readable and/or executable instructions that cause a computer or other electronic device to perform functions, actions, and/or behave in a desired manner. The instructions may be embodied in various forms such as routines, algorithms, modules or programs including separate applications or code from dynamically linked libraries. Software may also be implemented in various forms such as a stand-alone program, a function call, a servlet, an applet, instructions stored in a memory, part of an operating system or other type of executable instructions. It will be appreciated by one of ordinary skill in the art that the form of software is dependent on, for example, requirements of a desired application, the environment it runs on, and/or the desires of a designer/programmer or the like.

"Computer" or "processing unit" as used herein includes, but is not limited to, any programmed or programmable electronic device that can store, retrieve, and process data.

"Graphical planner" as used herein includes, but is not limited to, any system, method, or apparatus for scheduling, managing, maintaining, and displaying events, tasks, and/or related data in a substantially graphical manner.

Figure 1:
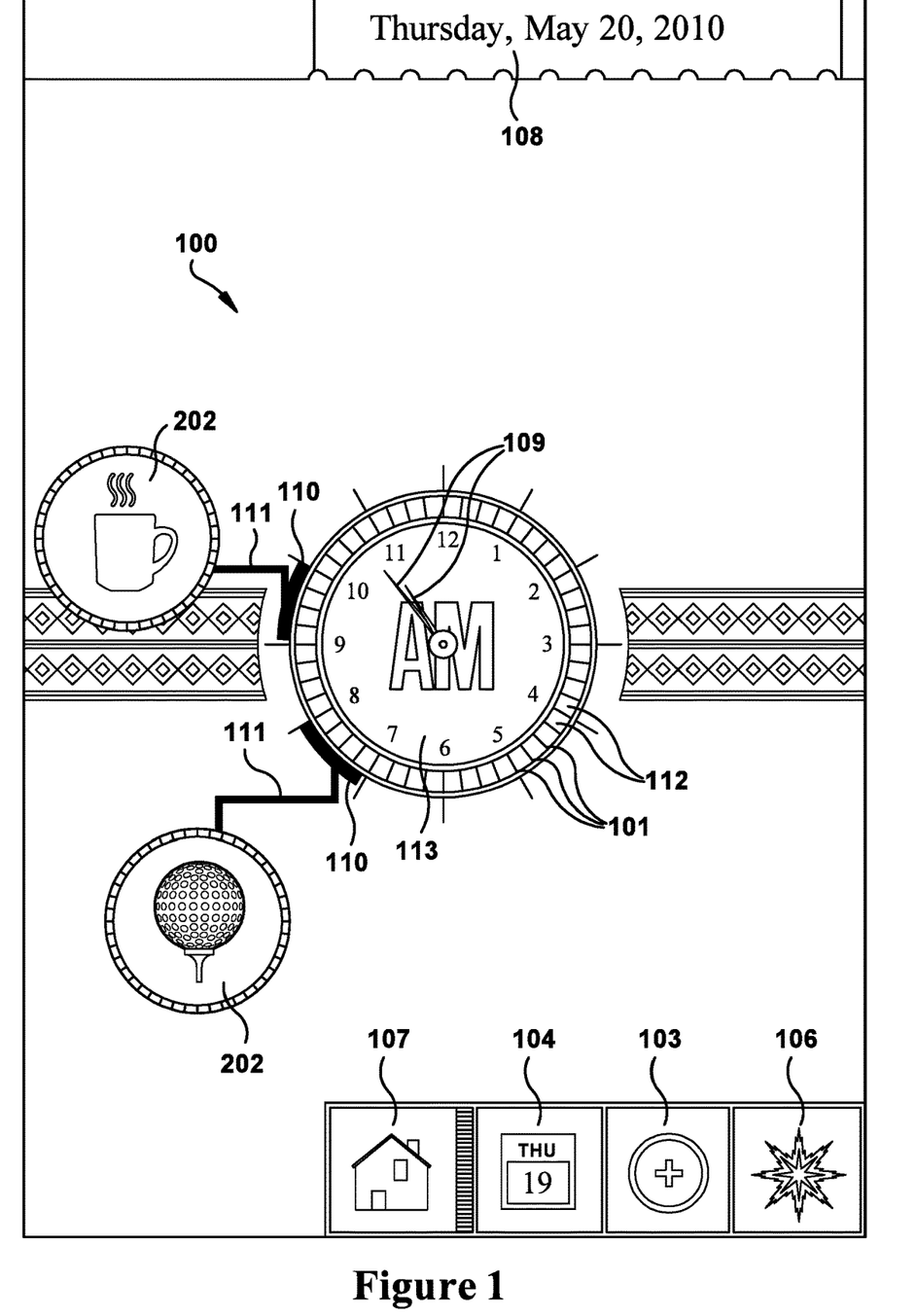
FIG. 1 is an image of an a.m. main screen with no events or tasks completed, according to one exemplary embodiment.
Figure 2A:
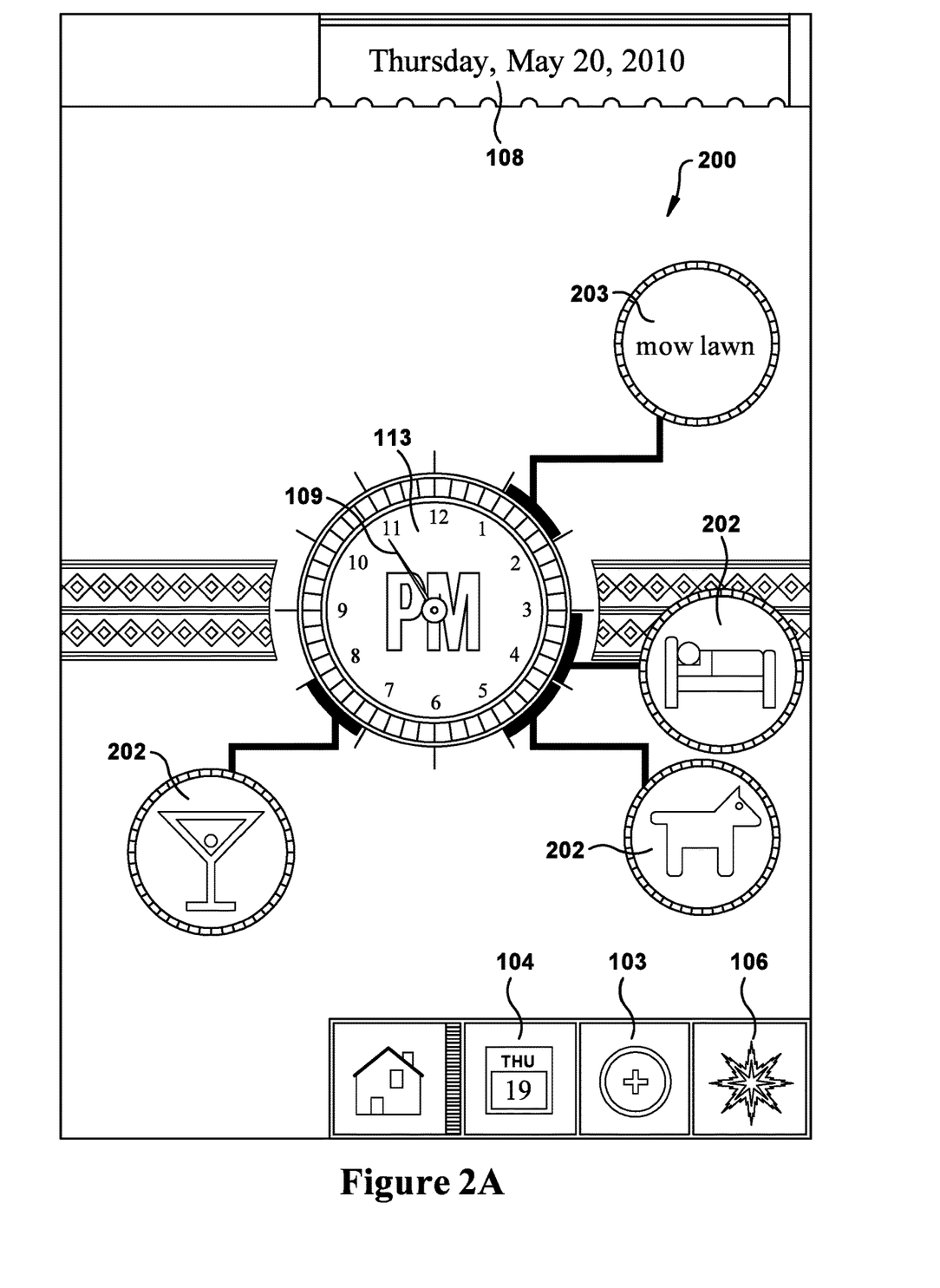
FIG. 2A is an image of a p.m. main screen with no events or tasks completed, according to one exemplary embodiment.
Figure 2B:
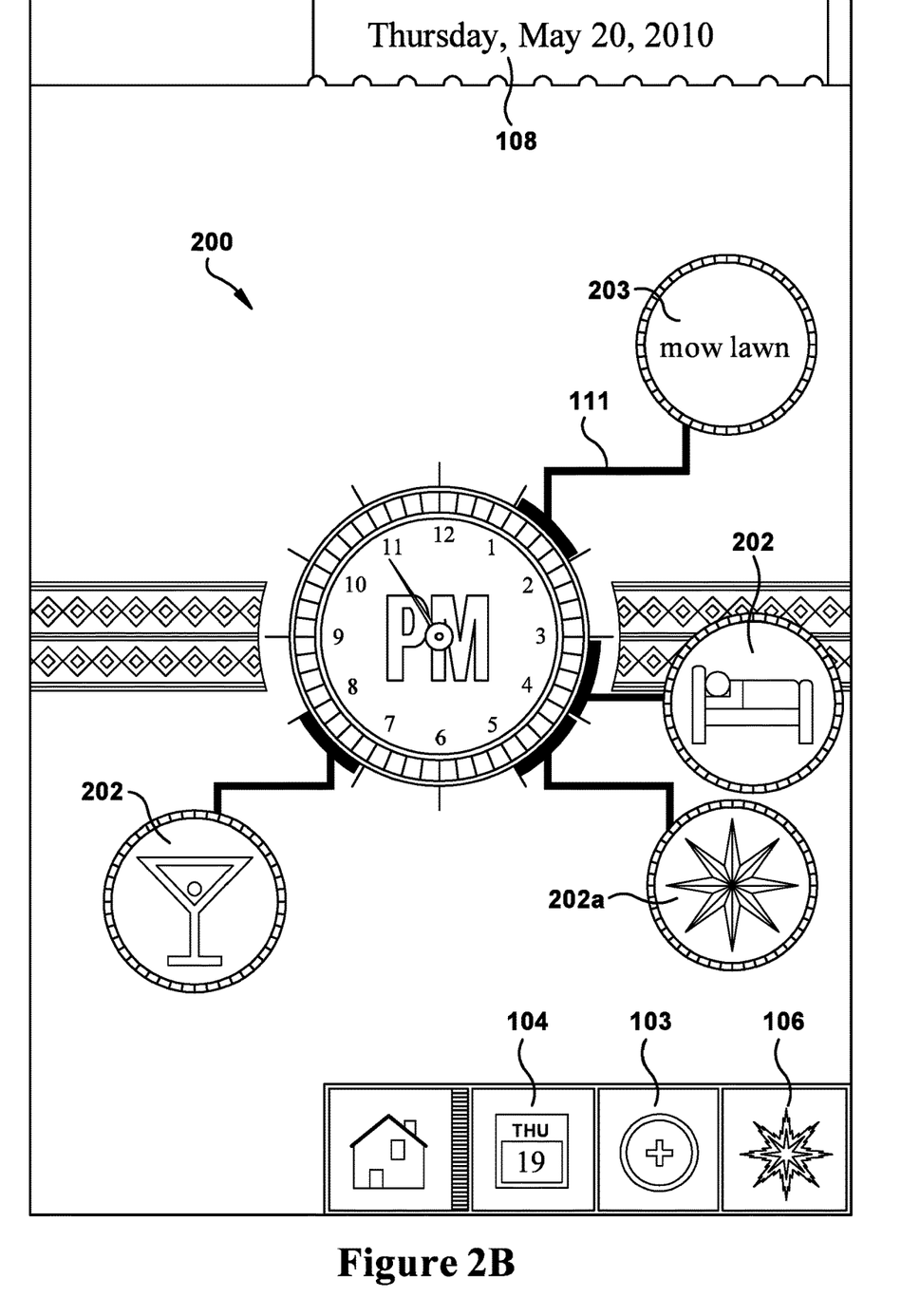
FIG. 2B is an image of the p.m. main screen of FIG. 2A with one event completed.

A graphical planner, according to one exemplary embodiment, is implemented as an apparatus including logic and/or software in a mobile computing device having a processing unit. In an exemplary embodiment, the graphical planner includes two main screens, an a.m. main screen 100, as shown in FIG. 1, and a p.m. main screen 200, as shown in FIGS. 2A and 2B. Each of the main screens displays a twelve hour period. In one exemplary embodiment, the a.m. main screen 100 includes a color scheme that differs from a color scheme of the p.m. main screen 200. In one exemplary embodiment, the a.m. main screen 100 is clearly labeled "AM" and the p.m. main screen 200 is clearly labeled "PM" to allow the user to readily determine which twelve hour period is currently being displayed.

In one exemplary embodiment, the user may navigate between consecutive periods of time, such as consecutive twelve hours periods, by interacting with the user interface. For example, in one embodiment, the user interface is a touch screen, and the user may slide his or her finger to the right or left on the touch screen to navigate between screens displaying consecutive twelve hour periods. Thus, for example, if the user is on the a.m. main screen 100, the user may slide his or her finger from right to left on the touch screen to navigate to the p.m. main screen 200. Sliding his or her finger on the p.m. main screen 200 will then bring the user to the a.m. main screen of the next day. Conversely, sliding his or her finger from left to right on the touch screen will allow the user to navigate to main screens corresponding to preceding time periods.

One of ordinary skill in the art will appreciate that any number of hours could be displayed on the main screen. For example, the main screen could display a 24 hour period, a six hour period or a period of hours defined by the user.

With reference to FIG. 1, the a.m. main screen 100 of the graphical planner is shown. One feature of the a.m. main screen 100 is a main analog clock 113. The main analog clock 113 includes the numerals (e.g., Arabic or Roman) 1 through 12, which are placed on the main analog clock 113 so as to correspond to each of the twelve a.m. hours. The main analog clock 113 can additionally include means for displaying the current time. In one exemplary embodiment, the means for displaying the current time are clock hands 109. A person of ordinary skill in the art will appreciate that the scheduling logic may communicate with other software to detect the current time zone settings.

In one exemplary embodiment, the main analog clock 113 is displayed in the center of the main screen. One of ordinary skill in the art will appreciate that the main analog clock 113 could be displayed anywhere on the screen and could be re-positioned or re-sized in response to user input. One of ordinary skill in the art will appreciate that the main analog clock 113 can be represented in different shapes and forms.

Pictured in association with the main analog clock 113 are one or more graphic icons 202. The graphic icons 202 correspond to events or tasks which the user wishes to complete. In one exemplary embodiment, the graphic icons 202 are displayed so as to be associated with the time of day on which the event or task is to occur. In one exemplary embodiment, tick marks 101 define spaces 112 around a periphery of the main analog clock 113. The spaces 112 are highlighted or otherwise changed in color to show the time and duration of a scheduled event. In one exemplary embodiment, a duration bar 110 is displayed to show the time and duration of a scheduled event or task. In one exemplary embodiment, a connecting line 111 is used to connect each graphic icon 202 to a relevant duration bar 110 and/or one or more relevant spaces 112 of the main analog clock 113. For example, with reference to FIG. 1, the user has scheduled golf from 7:00 a.m. until 8:00 a.m., and has scheduled coffee from 9:00 a.m. until 10:00 a.m. Duration bars 110, tick marks 101, spaces 112, and/or connecting lines 111 cooperate to display the time and the duration for these scheduled events.

In one exemplary embodiment, the graphical planner displays an a.m. main screen 100 and a p.m. main screen 200 for each day. A date and day of the week corresponding to each screen is also displayed to the user. For example, the date and day of the week may be displayed on a banner 108 on the main screens 100 and 200. One of ordinary skill in the art will appreciate that the day can be displayed nearly anywhere on the main screens 100 and 200, and need not necessarily be shown in the banner 108.

With further reference to FIG. 1, navigation within software implementing the graphical planner, according to one exemplary embodiment, will now be explained. The a.m. main screen 100 and the p.m. main screen 200 contain buttons. The buttons are defined regions, locations, or the like displayed on a screen to form a user interface, which allows for interaction between the user and the graphical planner. One of ordinary skill in the art will appreciate that the user may interact with the buttons any of numerous ways, such as by tapping on them with a finger, holding his or her finger on the button, or double tapping on the button in the case of a touch screen display; or, if a mouse is used, single or double clicking on the buttons. In addition to, or in lieu of, buttons, one of ordinary skill in the art will appreciate that the user may interact with the software through voice commands. In addition to, or in lieu of, buttons, one of ordinary skill in the art will appreciate that the user may interact with the software through menus, such as pull-down menus or pop-up menus. In addition, the user interface may include user input mechanisms provided by the operating system of the computing device or other external software. Hereafter, "tapping" will be used to collectively refer to any method of interacting with the user interface.

In one exemplary embodiment, the main screens 100 and 200 each contain an add event button 103, a traditional calendar button 104, and a complete button 106. In one exemplary embodiment, if the images displayed on the main screens 100 and 200 do not correspond to the current day, the screens include an additional button, a home button 107, which returns the user to the current twelve hour period of the current day when tapped.

Figure 3:
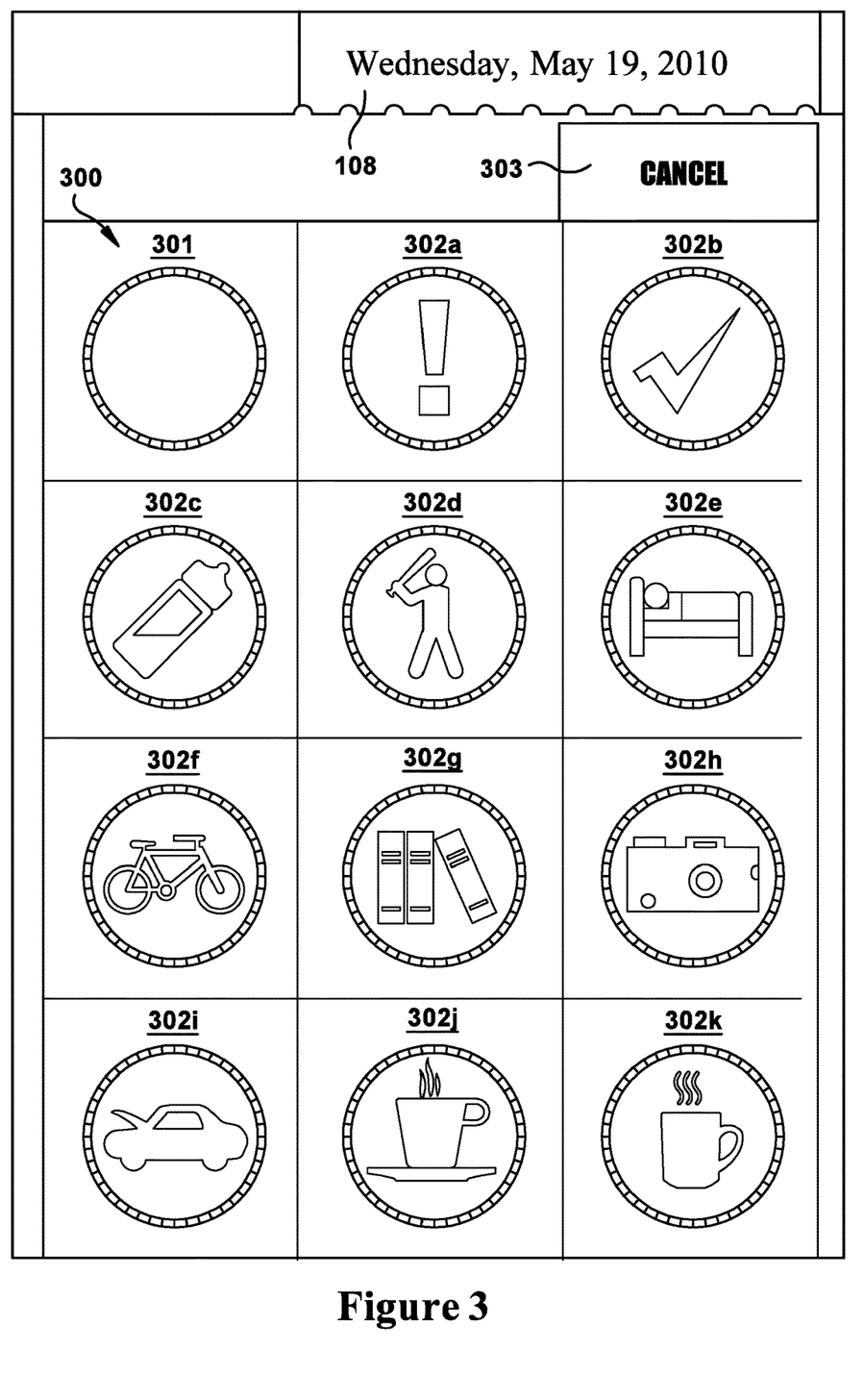
FIG. 3 is an image of a graphic icon library, according to one exemplary embodiment.

By tapping on the add event button 103, the user can navigate to a graphic icon library 300. A graphic icon library, according to one exemplary embodiment, is shown in FIG. 3. As further discussed below, the user may also navigate to the graphic icon library 300 from a details screen 400 (see FIG. 4).

The graphic icon library 300 includes one or more graphic icons, such as graphic icons 302a-302k. Any number of graphic icons can be included in the graphic icon library 300. The graphic icons 302a-302k depict images, symbols, or other graphical representations that illustrate or conjure corresponding user events or tasks that the user may wish to complete. For example, a bicycle graphic icon 302f may be used to represent a trip the user plans to take. In one exemplary embodiment, at least some of the graphic icons can be more abstract such as, for example, an exclamation point graphic icon 302a for representing something important that the user must do. In another exemplary embodiment, a generic bubble icon 301 is provided as one choice among the graphic icons. The generic bubble icon can take any form and may differ from the other graphic icons in that it may contain no image or symbol. For example, the generic bubble icon may appear as an empty balloon or a circle. In one embodiment, the user can select from among several different generic bubble icons. In one exemplary embodiment, the user can define a size and/or shape of the generic bubble icon.

In one exemplary embodiment, the graphic icon library 300 includes a cancel button 303. Tapping on the cancel button allows the user to navigate back to the previously displayed screen from which the user navigated.

In one exemplary embodiment, at least some of the graphic icons can be more specific to or otherwise customized by the user. For example, in one exemplary embodiment, the software may communicate or otherwise interface with a camera within the user's mobile computing device or with another computer. Using methods which are well known in the art, the software may allow a user to import a photograph from the camera, another computer, or a digital storage device, and then convert the photograph to a graphic icon. For example, the user could import a photograph of a beach (taken by the user or by someone else) and use the beach photograph as a graphic icon to show that he or she will be on vacation on a certain day or days. As another example, the user may wish to use the beach photograph icon simply as a reminder to go to the gym.

In one exemplary embodiment, the graphical planner provides customizable graphic icons and/or customizable sets of graphic icons. For example, a user population or group comprising medical students may desire a set of icons that corresponds to events and tasks that are common to the life of a medical student. On the other hand, a stay-at-home parent may desire a set of icons that corresponds to events and tasks that are common to the life of a stay-at-home parent. Using methods that are well known to those skilled in the art, the software may allow a user to import a customized set of graphic icons. In one exemplary embodiment, the software allows a user to import one or more specific icons, a la carte, from a menu of available icons. In one exemplary embodiment, graphic icons may be downloaded or imported in exchange for a fee that is separate from a fee for the graphical planner.

Once the user has navigated to the graphic icon library 300, the user may then select a desired graphic icon or choose the generic bubble icon. If the user navigated to the graphic icon library 300 from the a.m. main screen 100 or the p.m. main screen 200 then, once the user chooses the desired graphic icon (or chooses the generic bubble icon), the user is returned to the originating main screen. In one exemplary embodiment, the chosen graphic icon (or generic bubble icon) is then shown on the main screen. In one exemplary embodiment, the chosen graphic icon is placed in a predetermined area on the main screen. In one exemplary embodiment, the chosen graphic icon is placed at a random location on the main screen.

The user may then move the graphic icon (for example, by holding and dragging the icon with his or her finger on a touch screen, or by clicking on and dragging the icon using a mouse or similar input device) to another location on the main screen, such as a desired position on the main analog clock 113. If the graphic icon is moved to a position on the main analog clock 113, the graphic icon is then displayed so as to be associated with the time of day on which the event or task is to occur, as described above. In one exemplary embodiment, the software sets a default duration, such as one hour, when the user moves a graphic icon to a position on the main analog clock 113. Thus, a user may schedule an event or task in a simple three-step process by tapping on the add event button 103 of the a.m. main screen 100 or the p.m. main screen 200, selecting a graphic icon 302 or the generic bubble icon 301, and moving the graphic icon 302 or the generic bubble icon 301 to a desired location on the main analog clock 113. If the event or task gets rescheduled or postponed, the user may re-associate the graphic icon or generic bubble to a new time or date, and/or adjust its duration. In one exemplary embodiment, the user may reschedule events or tasks by tapping on, then dragging, the graphic icon or generic bubble to the new time. Alternatively, with reference to FIG. 4, the user may reschedule an event or task by changing the beginning time or end time using the data input fields 404 and 405 on the details screen 400, as further described below. In addition, the user may adjust the duration of an event or task by touching with two fingers the opposite edges of the associated duration bar 110 on the main screen 100 or 200 and moving his or her fingers closer or farther apart.

In one exemplary embodiment, when a user schedules an event having a duration that exceeds the duration of time that is displayed on the main screen 100 or 200, then the duration bar 110 extends to and is shown on the main screen corresponding to the next consecutive time period. For example, with reference to FIG. 1, if the user schedules an event beginning at 11:00 a.m. and ending at 2:00 pm on May 20, 2010, then a duration bar 110 is displayed from 11:00 to 12:00 on the a.m. main screen 100 and from 12:00 to 2:00 on the p.m. main screen 200. For an event having a duration that exceeds one full day, then the duration bar 110 may continue to be shown in association with the main analog clock 113 for each intervening period.

In one exemplary embodiment, the scheduling logic allows the user to adjust the size of the graphic icon or generic bubble. For example, a user may wish to make the graphic icon associated with a particularly important event appear larger than other graphic icons on the main screen 100 or 200. Alternatively, the user may wish to change the color of the graphic icon to indicate the level of its importance or other pertinent information. In addition, the user may choose to associate a sound file with a particular graphic icon, such an inspirational or encouraging audible message. Such functionalities provide the user a more accurate "picture" of what is to be accomplished in a given time period and provide the user a new way of prioritizing events and tasks and/or getting motivated to complete events or tasks. Such functionalities are not provided by prior art planners. In another exemplary embodiment, the scheduling logic sizes or re-sizes the graphic icons and generic bubble icons to approximate an optimum size depending on the number of events or tasks scheduled in the time period displayed on the main screen. A display size and resolution of the user's computing device can also be taken into consideration when approximating the optimum size. For example, if the user has scheduled four events or tasks in a single twelve hour period, the graphic icons may appear in a first size, and if the user has scheduled eight events or tasks in a single twelve hour period, the graphic icons may appear in a second, smaller, size.

In another exemplary embodiment, the scheduling logic approximates the optimal placement of the graphic icons in relation to the main analog clock 113, so that each graphic icons is correctly associated with the time and duration chosen by the user in relation to the main analog clock 113. By optimally sizing the graphic icons and/or optimally placing the graphic icons on the screen, the graphical planner conveys information more efficiently and more simply than other prior art planners. Using graphic icons transcends language barriers, removes the limitations imposed by space consuming text, and requires less user effort. Such functionalities are particularly advantageous in view of the space constraints associated with many mobile computing devices.

Figure 7:
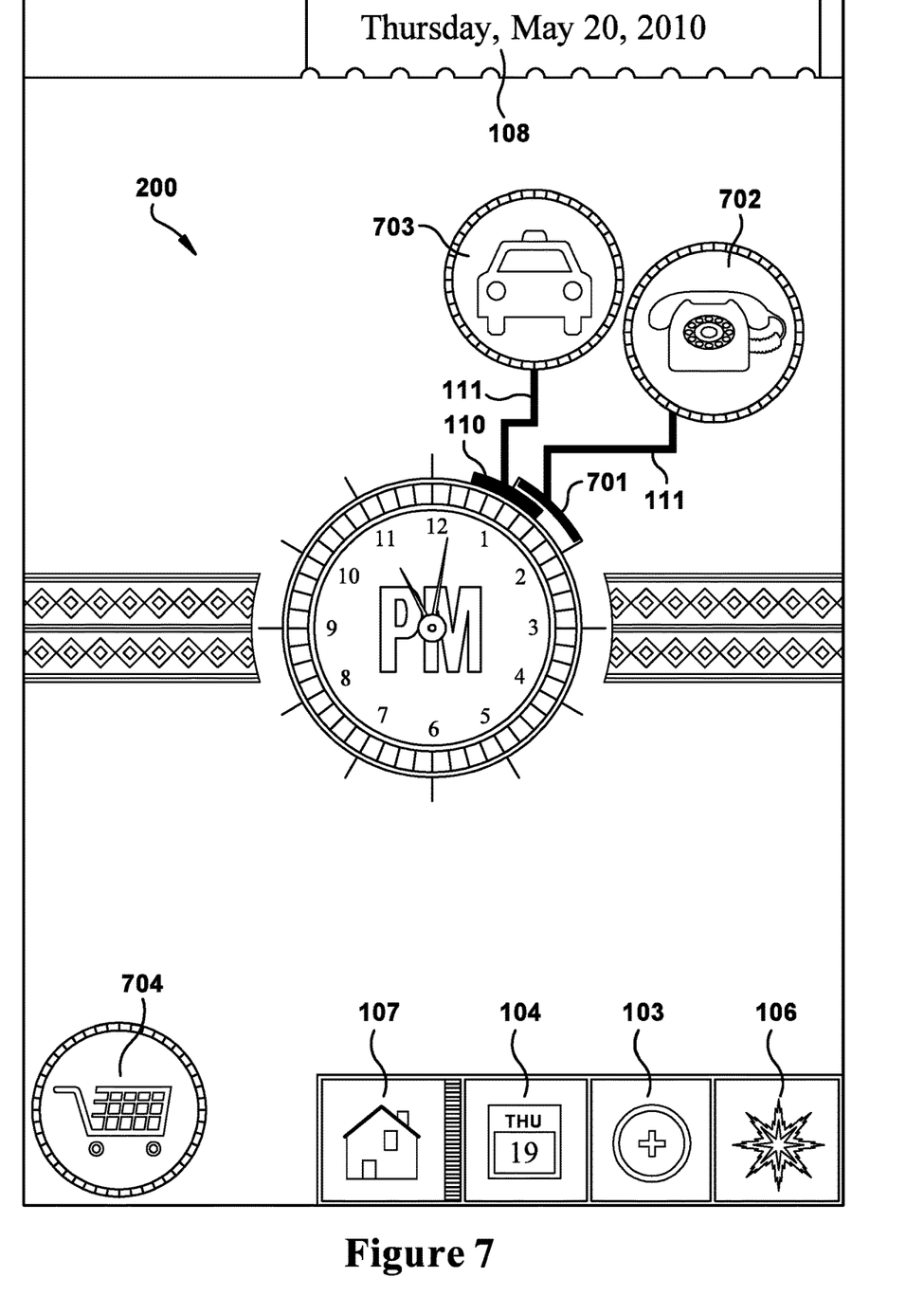
FIG. 7 is an image of a p.m. main screen including one virtual event and two events scheduled to overlap in time, according to one exemplary embodiment.

Additionally, as shown in FIG. 7, the user can choose not to associate a selected graphic icon with a particular time. Such may be the case, for example, if the user chose a birthday cake icon and wants to remember to wish his or her friend a happy birthday at some point before the end of the 12 hour period. Herein, events that are unassociated with a particular time will be referred to as "virtual events" and are synonymous with tasks. For virtual events, the graphic icon is displayed without a connecting line 111 or duration bar 110. In one exemplary embodiment, one or more zones, locations, or the like are defined on the main screens 100 and 200 of the graphical planner, with the zones reserved for displaying virtual events. With reference to FIG. 7, a virtual event is represented by a grocery cart icon 704. By displaying both virtual events and scheduled events on the same screen, the apparatus of the invention overcomes the common problem of prior art planners, which manage, maintain and display events and tasks separately in a linear format.

In another exemplary embodiment, graphic icons corresponding to virtual events may instead move or appear to bounce or float in a predetermined, random or user driven pattern around the screen. Once the actual task corresponding to the virtual event is completed by the user, the user may "capture" the moving graphic icon and indicate its completion, as further described herein. In this manner, the apparatus of the invention provides an enjoyable user experience associated with completion of a task.

In one exemplary embodiment, graphic icons corresponding to recurring virtual events may continue to appear on screens corresponding to future dates until the user deletes them. Thus, a user may create a reminder for a virtual event in a simple two-step process by tapping on the add event button 103 of the a.m. main screen 100 or the p.m. main screen 200, and selecting a desired graphic icon 302 or the generic bubble icon 301.

Figure 4:
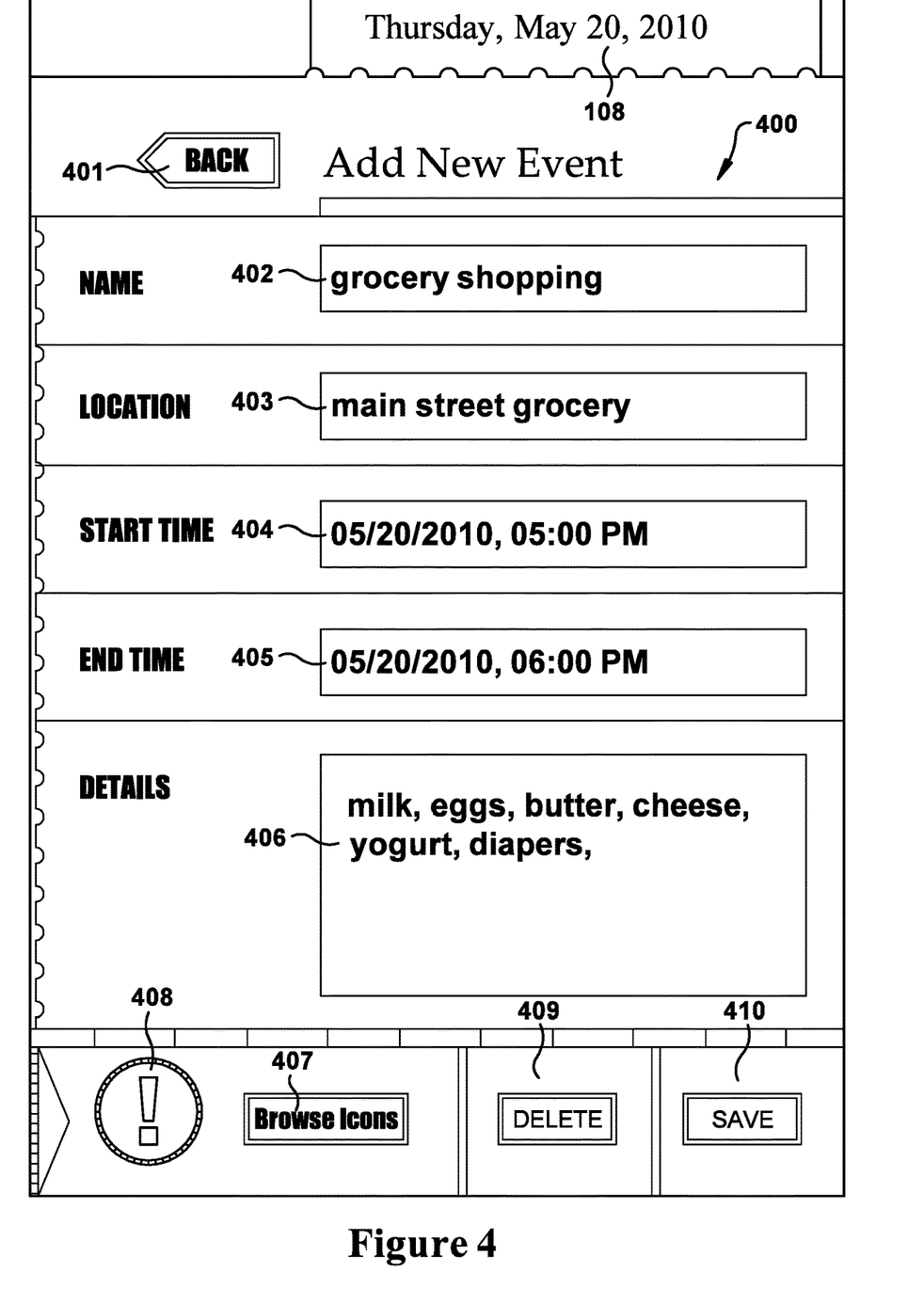
FIG. 4 is an image of a details screen, according to one exemplary embodiment.

Once a desired graphic icon has been chosen by the user and placed by the software on the screen, the user may then enter additional details regarding the event or task. In one exemplary embodiment, the user taps on the graphic icon to navigate to a details screen 400, as shown in FIG. 4. In one exemplary embodiment, data input fields 402, 403, 404, 405, and 406 are provided on the details screen 400 to allow the user to input information associated with the event or task. For example, the user may enter the name of the event via data input field 402, the location of the event via data input field 403, the start time of the event via data input field 404, the end time of the event via data input field 405, and/or other details for the event via data input field 406. For example, if the user plans on going to the grocery store from 5:00 to 6:00 on a given day, the user may input the name of the store in data input field 402, the location of the store in data input field 403, the start time of the planned shopping trip in data input field 404, the end time of the planned shopping trip in data input field 405, and the items needed at the store (e.g., milk, eggs, butter, cheese, yogurt and diapers) in the data input field 406. Thus, using the graphical planner, the user can easily create a reminder for something he or she needs to do (such as go to the store), as well as conveniently maintain the details regarding that event or task (such as the list of items needed at the store) all within one convenient application that provides a consistent, easy-to-use user interface. Thus, the apparatus of the invention conveniently manages, maintains and displays information pertaining to events and tasks in a more convenient and user-friendly way than does the prior art planners.

In accordance with the general inventive concepts, any number of items of information could be inputted via the data input fields. Furthermore, the data input fields can be given any names or labels. Any number of data input fields can be used without departing from the spirit and scope of the general inventive concepts. The general inventive concepts also contemplate use of any viable form of user input device, software, logic, or the like. For example, in one exemplary embodiment, software displays a keyboard on a screen of the user's mobile computing device, which allows the user to input information. As another example, in one exemplary embodiment, the user's mobile computing device includes one or more scroll wheels that allow the user to select or otherwise input information such as the start and end times of an event or task. As another example, in one exemplary embodiment, the computing logic may convert voice input into text or commands.

In another example, in one exemplary embodiment, the computing logic may associate voice input with graphic icons. For example, each graphic icon or button could have a voice command tag associated with it, to accept user input through voice commands. Thus, for example, a user scheduling a birthday party could simply state "add cake."

In one exemplary embodiment, the graphical planner may provide one or more computer links to websites containing additional information pertaining to an event or task. Such information may include, for example, walking or driving directions, biographical information about a person the user is meeting, or company or product information pertaining to a scheduled meeting. In another embodiment, information regarding the location of an event may be used to guide the user to the location using global positioning software installed on the user's computing device.

In one exemplary embodiment, if the user has navigated to the details screen 400 from the main screen 100 or 200, and if the user has moved a selected graphic icon to a particular position on the main analog clock 113, then the start time and the end time on the details screen 400 are set by default to those times corresponding to the chosen place on the main analog clock 113.

In one exemplary embodiment, the user may set events to recur at user determined intervals. For example, the user could schedule a bill payment on the last day of each month, a birthday on the same day each year, or have an event or task recur each day until the user indicates its completion. In this case, the scheduling logic would cause the graphic icon associated with the event or task to appear on the main screen at the user-defined intervals.

A person of ordinary skill in the art will appreciate that the scheduling logic may store information or details associated with events or tasks in memory, and allow the user to access information about past or future events or tasks. In addition, in one exemplary embodiment, the user can select various forms of output for such information. For example, the user may print screens showing scheduled events or tasks, or share his or her schedule, or information regarding particular events or tasks, using email or other communication technology.

In one exemplary embodiment, the scheduling logic provides alerts when an event or task is impending. For example, the user may hear an audible alarm or receive a visual notification of an upcoming event. In one exemplary embodiment, the scheduling logic is operable to provide "push" notification, such that the user receives a notification of an upcoming event or task while running other software applications on his or her computing device. In one exemplary embodiment, the scheduling logic synchronizes events or tasks with events or tasks scheduled by the user utilizing one or more other applications.

With further reference to FIG. 4, the details screen 400 may include a save button 410. By tapping on the save button 410, a user can save the information entered into the data input fields 402, 403, 404, 405, and 406. Tapping on the save button 410 also allows the user to navigate back to the a.m. main screen 100 or the p.m. main screen 200, from which the user navigated. The display on the main screen 100 or 200 will be updated to reflect information entered by the user on the details screen 400, such as the start time or end time of an event.

Additionally, if the user chose the generic bubble icon 301, then characters entered by the user into a data input field, such as the name data input field 402, are displayed in the generic bubble on the main screen. For example, in the p.m. main screen 200 shown in FIGS. 2A and 2B, a generic bubble icon 203 includes characters forming the words "mow lawn," which correspond to characters entered into the data input field 402 on the details screen 400. Thus, the graphical planner allows the user to use text combined with graphics, as well as graphics alone, to schedule events and set reminders for tasks. In one exemplary embodiment, the user input text is abbreviated or otherwise modified (e.g., font size changed) to better fit within the generic bubble icon. In this manner, the graphical planner also allows the user to create customized icons by enclosing user-supplied text within a generic bubble. In another embodiment, the graphical planner also allows the user to create customized icons by displaying user-supplied text or imagery in connection with a graphic icon.

With further reference to FIG. 4, the details screen 400 may include a delete button 409. By tapping on the delete button 409, a user can delete the event or task and/or its corresponding graphic icon or generic bubble icon that was selected prior to navigating to the details screen 400. In one exemplary embodiment, tapping on the delete bubble 409 causes a warning screen to appear on top of the details screen 400, which allows the user an opportunity to confirm that he or she wishes to delete the corresponding event or task.

With further reference to FIG. 4, the details screen 400 may include a browse icons button 407. By tapping on the browse icons button 407, a user can navigate directly to the graphic icon library 300. Once the graphic icon library 300 is displayed, the user can choose a different graphic icon 302a-302k or choose the generic bubble icon 301 to associate with an event or task.

With further reference to FIG. 4, the graphical planner may include a graphic icon display zone 408. The graphic icon display zone 408 displays the graphic icon 302a-302k, or the generic bubble icon 301, presently associated with the event or task for which details are being entered by the user via the presently displayed details screen 400.

Figure 5:
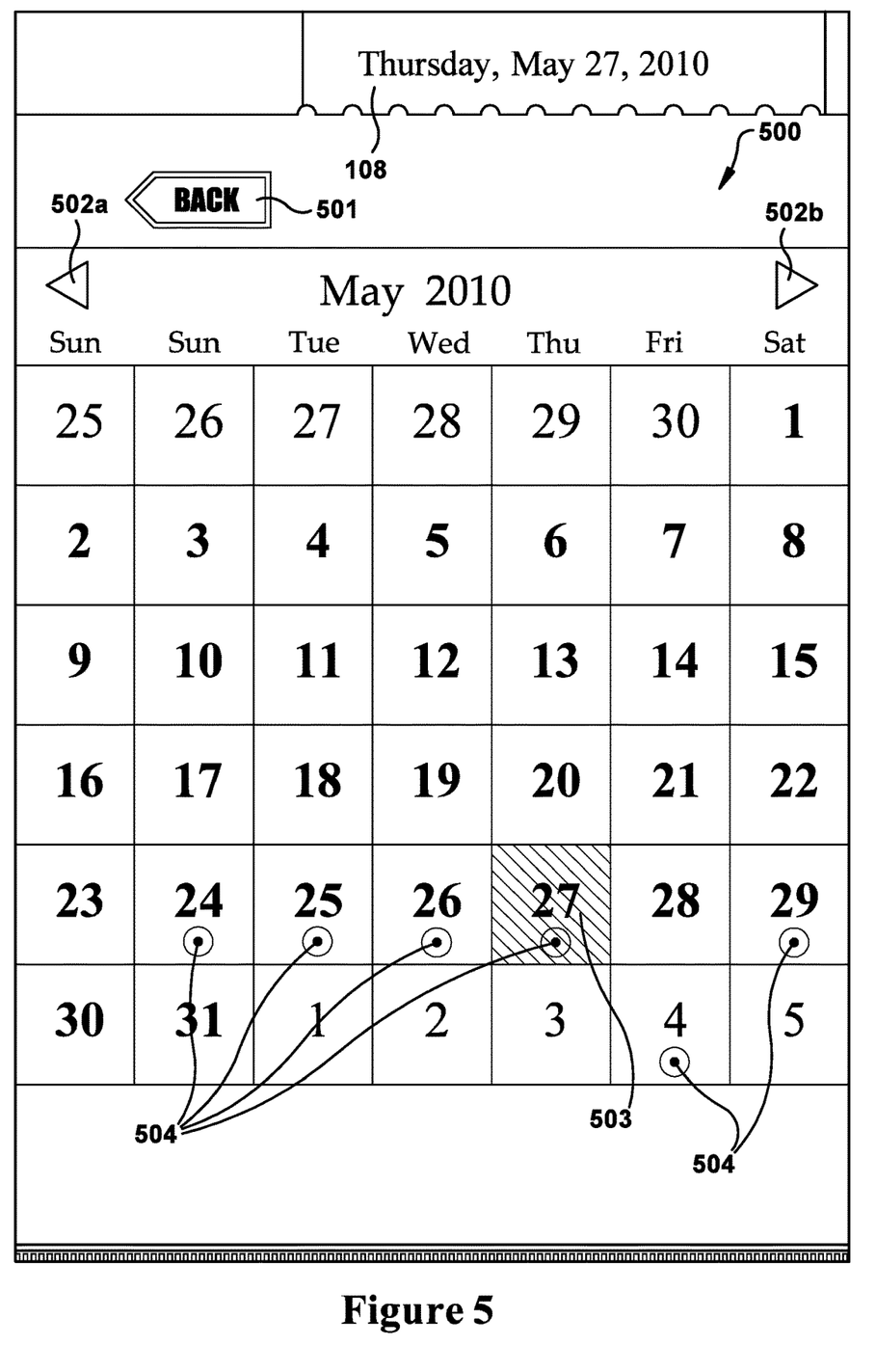
FIG. 5 is an image of a calendar screen, according to one exemplary embodiment.

With reference to FIGS. 1, 2A, and 2B, the a.m. main screen 100 and the p.m. main screen 200 may include a traditional calendar screen button 104. By tapping on the traditional calendar screen button 104, the user can navigate to a traditional calendar screen. A traditional calendar screen 500, according to one exemplary embodiment, is shown in FIG. 5. The traditional calendar screen 500 displays days, weeks, months and/or years in a typical calendar format. In one exemplary embodiment, when the user taps on the traditional calendar screen button 104 on the a.m. main screen 100 or the p.m. main screen 200, the user is brought to the traditional calendar screen 500 based on or otherwise including the day from the main screen 100 or 200. A person of ordinary skill in the art will appreciate that the traditional calendar screen 500 may display a one year block of time, a month block of time, a one week block of time, or any other block of time. The traditional calendar screen 500 may further be customizable by the user.

With reference to FIG. 5, the traditional calendar screen 500 includes a back button 502a, which allows the user to navigate through the displayed calendar going backward in time, and a forward button 502b, which allows the user to navigate through the calendar going forward in time. Instead of back and forward buttons 502a and 502b, a person of ordinary skill in the art will appreciate that other navigation means could be implemented. A scroll bar or, where the user interface is a touch screen, a finger slide mechanism, are a few examples.

In one exemplary embodiment, the traditional calendar screen 500 includes event notification dots 504 or other identifying symbols or markings. The presence of an event notification dot 504 indicates that an event or task is scheduled on the corresponding date. This allows the user to readily determine on which days (e.g., for a displayed week, month, or year) events or tasks are scheduled. For example, as shown in FIG. 5, the presence of event notification dots 504 on the squares corresponding to May 24, 25, 26, 27 and 29, 2010 and Jun. 4, 2010 indicates that at least one event or task has been scheduled by the user on each of those dates.

In one exemplary embodiment, the traditional calendar screen 500 utilizes a contrasting square 503 or other highlighting mechanism. The contrasting square 503 is placed on the calendar screen 500 to indicate the present date. The present date may also be displayed in the banner 108.

The traditional calendar screen 500 may also include a return button 501. The return button 501 allows the user to return to the previous screen from which the user navigated to the traditional calendar screen 500.

Figure 6:
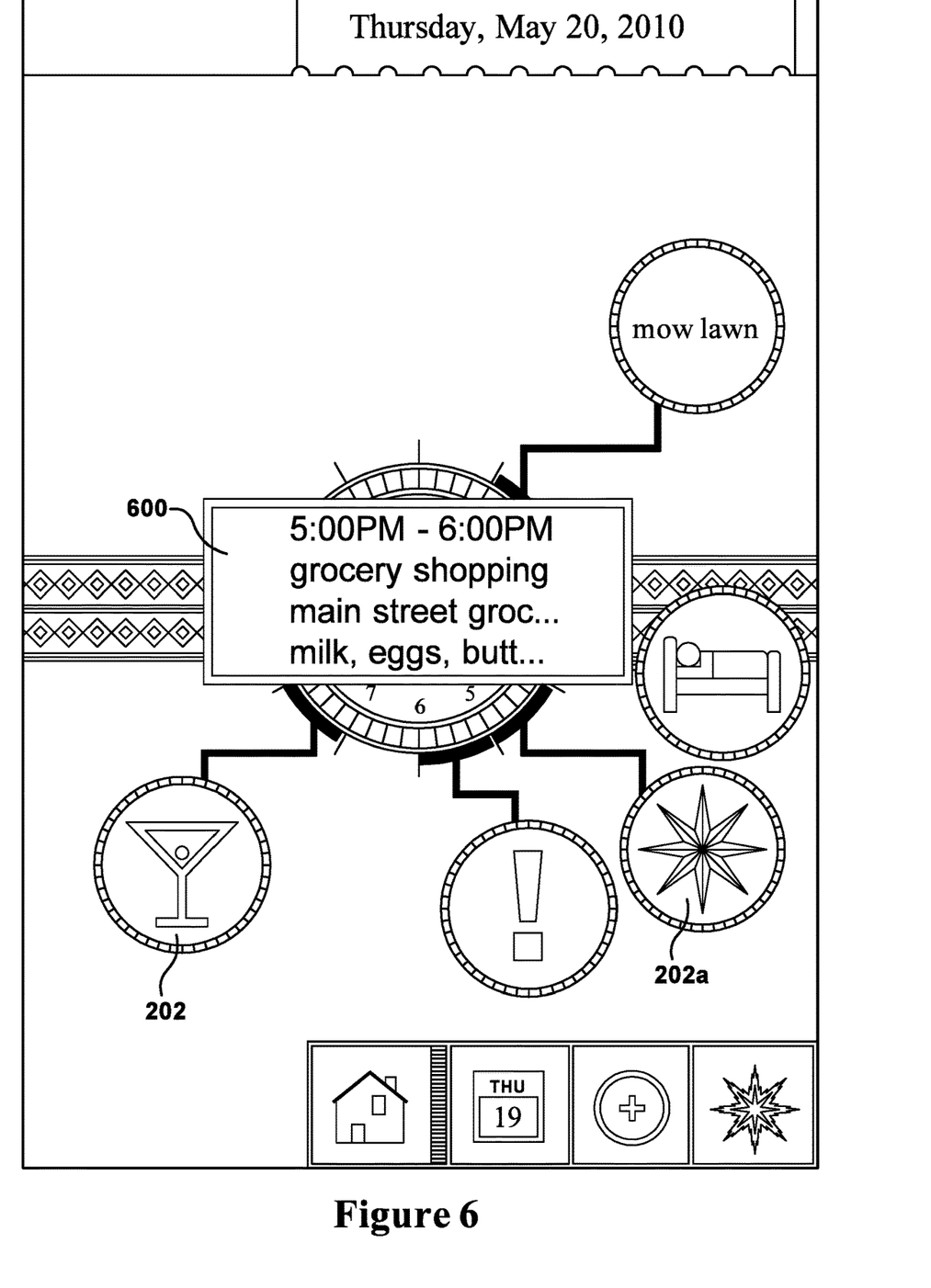
FIG. 6 is an image of a screen having a quick view window, according to one exemplary embodiment.

With reference to FIG. 6, the a.m. main screen 100 and the p.m. main screen 200 may include a quick view window 600. The quick view window 600 displays information associated with a particular event or task. For example, the quick view window 600 may display the name, the location, the start time, the end time, and/or associated details of the event or task. The quick view window 600 may be displayed, for example, in response to the user selecting, hovering over, or otherwise interfacing with a graphic icon or the generic bubble icon corresponding to the particular event or task and displayed on the a.m. main screen 100 or the p.m. main screen 200. In one exemplary embodiment, the quick view window 600 is displayed on top of the main analog clock 113 on the corresponding a.m. main screen 100 or p.m. main screen 200.

With reference to FIGS. 1, 2A, and 2B, the main screens 100 and 200 may include a complete button 106. The complete button 106 allows the user to indicate that he or she has completed a particular event or task. In one exemplary embodiment, the user can interface with the complete button 106 by selecting the complete button 106 with his or her finger or a stylus in the case of a touch screen, or with an input device such as a keyboard, scroll wheel, or the like formed with or otherwise connected to the user's mobile computing device. By tapping on the complete button 106, the complete button enters an active state for a period of time, which may be predetermined (e.g., 3 seconds), or which may last until the user takes another action. During this active state, the user can then tap on or otherwise interface with a graphic icon or the generic bubble icon displayed on the main screen 100 or 200 to indicate that an event or task corresponding to the selected graphic icon or the generic bubble icon has been completed. In one exemplary embodiment, when the user taps on or otherwise interfaces with the graphic icon or the generic bubble icon, a warning screen is displayed and the user is prompted to confirm that he or she would like to indicate the event or task is complete. When the user so confirms, the graphic icon or generic bubble icon is then replaced by a completion icon 202a, such as a star or a popped balloon. In one exemplary embodiment, the completion icon 202a is a modified form of the graphic icon it is replacing, such as the graphic icon with a different color scheme or a line drawn therethrough. In one exemplary embodiment, instead of displaying a completion icon 202a, the graphic icon or the generic bubble icon corresponding to the completed task is simply removed from the main screen 100 or 200.

The operation of the complete button 106 will now be further described with reference to FIGS. 2A and 2B. In FIG. 2A, a graphic icon 202 corresponding to an image of a dog is displayed on the p.m. main screen 200 as associated with the time slot spanning 4:00 p.m. to 5:00 p.m. on Thursday, May 20, 2010. The user may have, for example, placed the dog icon at this time slot to schedule a trip to the veterinarian for his or her pet. In FIG. 2B, at the same time slot, there is shown a completion icon 202a. Thus, the graphical planner allows the user to simply and graphically indicate completion of a previously scheduled event or task. By allowing the user to replace events or tasks with a star or other image having a positive connotation, the graphical planner provides a reward or incentive to complete events or tasks.

In one exemplary embodiment, the software of the invention may further activate a sound file at the moment when a graphic icon 202 or generic bubble icon 203 is converted to the completion icon 202a. Preferably, the sound file conveys a positive message or mood. By playing a sound file at the moment when a user indicates an event or task's completion, the software of the invention further provides a reward or incentive to complete events or tasks. In another embodiment, upon the user indicating an event or task is complete, the graphical planner may display an animation, such as an animation showing the explosion, destruction, or modification of the associated graphic icon. Such animation may be accompanied by a sound file.

In one exemplary embodiment, the graphical planner may automatically indicate an event's completion once the time scheduled for completion of the event has elapsed. For example, if a meeting is scheduled from 2:00 p.m. to 3:00 p.m., at 3:01 p.m., the scheduling logic may determine the event is complete and replace the corresponding graphic icon with the completion icon 202a. In one exemplary embodiment, the user can chose whether events are automatically shown as complete upon passage of the scheduled time, or whether events are shown as complete upon the user's affirmative indication of completion.

In one exemplary embodiment, the graphical planner allows a graphic icon or generic bubble icon to be restored to its original state after the user has indicated that the associated task or event is complete. For example, if the user inadvertently indicated an event was complete, the graphical planner allows the user to replace the completion icon 202a with the original icon 202, and in addition, may further restore the associated information from the data input fields 402-406.

The graphical planner can display events or tasks that overlap in duration. In one exemplary embodiment, when two events or tasks overlap in duration, an overlapping duration bar 701 can be displayed on the a.m. main screen 100 or the p.m. main screen 200. For example, as shown in FIG. 7, the user has scheduled an event from 1 p.m. to 2 p.m. on May 20, 2010, as represented by a phone graphic icon 702. The user has also scheduled another event from 12:30 p.m. to 1:30 p.m. on the same day, as represented by a car graphic icon 703. An overlapping duration bar 701 and connecting line 111 may be used to indicate the time and duration of the second scheduled event, corresponding to a phone graphic icon 702.

A person of ordinary skill will appreciate that the graphical planner may include one or more warning or confirmation screens or pop-up windows. For example, in one exemplary embodiment, when the user schedules an event that conflicts in time with a previously scheduled event, the graphical planner may display a screen asking the user to confirm the user would like the two events to overlap in time. Any number of warning or confirmation screens may be included in the graphical planner.

In one exemplary embodiment, by selecting the add event icon 103 from the main screen 100 or 200, the user navigates directly to the details screen 400 instead of first choosing a graphic icon or the generic bubble icon from the graphic icon library 300. Once at the details screen 400, the user can tap on the browse icons button 407 to choose the associated graphic icon or the generic bubble icon from the graphic icon library 300. A person of ordinary skill in the art will appreciate that various other modifications to the flow of the navigation are possible, all of which are within the scope of the invention.

In another exemplary embodiment, one or more of the screens described above may be combined. For example, the scheduling logic may display the library of graphic icons on the main screen 100 or 200. Depending on the size and other limitations of the user interface and the processing unit, either the entire library of graphic icons or a subset (e.g., "favorites") may be displayed on the main screen 100 or 200. For example, the library of graphic icons could extend across a portion of one of the screens, such as the main screen 100 or 200, the details screen 400, or another screen. If the library of graphic icons is displayed on the main screen 100 or 200, there may be no need for an add event button 106. For example, in this embodiment, the user could drag and drop the desired graphic icons from one region on the main screen 100 or 200 to a second region on the main screen 100 or 200, such as a region associated with a particular time on the analog clock 113. In this manner, the user can schedule an event or set a reminder for a task in a one-step process by simply dragging a graphic icon 202 to a region on the main screen 100 or 200.

The above description of specific embodiments has been given by way of example. From the disclosure given, those skilled in the art will not only understand the general inventive concepts and attendant advantages, but will also find apparent various changes and modifications to the structures and methods disclosed. For example, the general inventive concepts are not typically limited to any particular interface between a user and the user's mobile computing device. Thus, for example, use of alternative user input mechanisms, such as voice commands, are within the spirit and scope of the general inventive concepts. As another example, although the embodiments disclosed herein have been primarily directed to a mobile computing device, the general inventive concepts could be readily extended to a personal computer (PC) or other relatively fixed console computers. It is sought, therefore, to cover all such changes and modifications as fall within the spirit and scope of the general inventive concepts, as described and claimed herein, and equivalents thereof.

The invention claimed is:

1. A non-transitory computer-readable medium including instructions for scheduling one or more events or tasks stored thereon that, when executed by a processor, cause the processor to perform the following:
displaying one or more screens associated with a date;
displaying a plurality of graphic icons;
identifying a selection of a specific graphic icon for an event or task;
upon identifying the selection, displaying the specific graphic icon on a first screen associated with a specific date, wherein the specific date corresponds to the date on which the event or task is to be attended or performed;
allowing additional data to be associated with the event or task; and
displaying the additional data.

2. The computer readable medium of claim 1, further comprising instructions that, when executed by the processor, causes the processor to perform the following:
identifying a specific time for the event or task is to be attended or performed; and
customizing one or more of the graphic icons to include the specific time.

3. The computer readable medium of claim 1, further comprising instructions that, when executed by the processor, causes the processor to perform the following:
identifying that the event or task has been completed or has passed; and
changing the display of the specific graphic icon on the first screen.

4. The computer readable medium of claim 1, further comprising instructions that, when executed by the processor, causes the processor to perform the following:
identifying that the event or task has been completed or has passed; and
replacing the specific graphic icon with a different predetermined graphic icon.

5. The computer readable medium of claim 1, wherein one or more of the plurality of graphic icons includes alphanumeric data.

6. The computer readable medium of claim 1, wherein one or more of the plurality of graphic icons consists of alphanumeric data.

7. A method in a scheduling application for scheduling one or more events or tasks comprising:
displaying one or more screens associated with a date;
displaying a plurality of graphic icons;
identifying a selection of a specific graphic icon for an event or task;
displaying the specific graphic icon on a first screen associated with a specific date, wherein the specific date corresponds to the date on which the event or task is to be attended or performed; and
if a specific time is identified for the event or task to be attended or performed, visually associating the specific graphic icon with the specific time.

8. The method of claim 7, further comprising:
identifying a different date on which the event or task is to be attended; and
associating the specific graphic icon with the different date.

9. The method of claim 7, further comprising:
identifying that the event or task has been completed or has passed; and
changing the display of the specific graphic icon on the first screen.

10. The method of claim 7, further comprising:
identifying that the event or task has been completed or has passed; and
replacing the specific graphic icon with a different predetermined graphic icon.

11. The method of claim 7, wherein one or more of the plurality of graphic icons includes alphanumeric data.

12. The method of claim 7, wherein one or more of the graphic icons is specific to or is customized to the event or task.

13. The method of claim 7, further comprising:
allowing additional data to be associated with the event or task and displaying the additional data.

14. The method of claim 13, wherein the additional data includes alphanumeric data.

15. A non-transitory computer-readable medium including instructions for scheduling one or more events or tasks stored thereon that, when executed by a processor, cause the processor to perform the following:
displaying one or more screens associated with a date;
displaying a plurality of graphic icons, wherein one or more of the graphic icons is specific to or is customized to an event or task;
identifying a selection of a specific graphic icon for the event or task; and
upon identifying the selection, displaying the specific graphic icon on a first screen associated with a specific date, wherein the specific date corresponds to the date on which the event or task is to be attended or performed.

16. The computer readable medium of claim 15, further comprising instructions that, when executed by the processor, causes the processor to perform the following:
identifying a different date on which the event or task is to be attended; and
associating the specific graphic icon with the different date.

17. The computer readable medium of claim 15, further comprising instructions that, when executed by the processor, causes the processor to perform the following:
identifying that the event or task has been completed or has passed; and
changing the display of the specific graphic icon on the first screen.

18. The computer readable medium of claim 15, further comprising instructions that, when executed by the processor, causes the processor to perform the following:
identifying that the event or task has been completed or has passed; and replacing the specific graphic icon with a different predetermined graphic icon.

19. The computer readable medium of claim 15, further comprising instructions that, when executed by the processor, causes the processor to perform the following:

allowing additional data to be associated with the event or task and displaying the additional data.

20. The computer readable medium of claim 19, wherein one or more of the graphic icons or the additional data includes alphanumeric data.

* * * * *